Nov. 16, 1943.  H. E. GOLDSTINE  2,334,190
FREQUENCY MODULATION DETECTION
Filed June 18, 1940
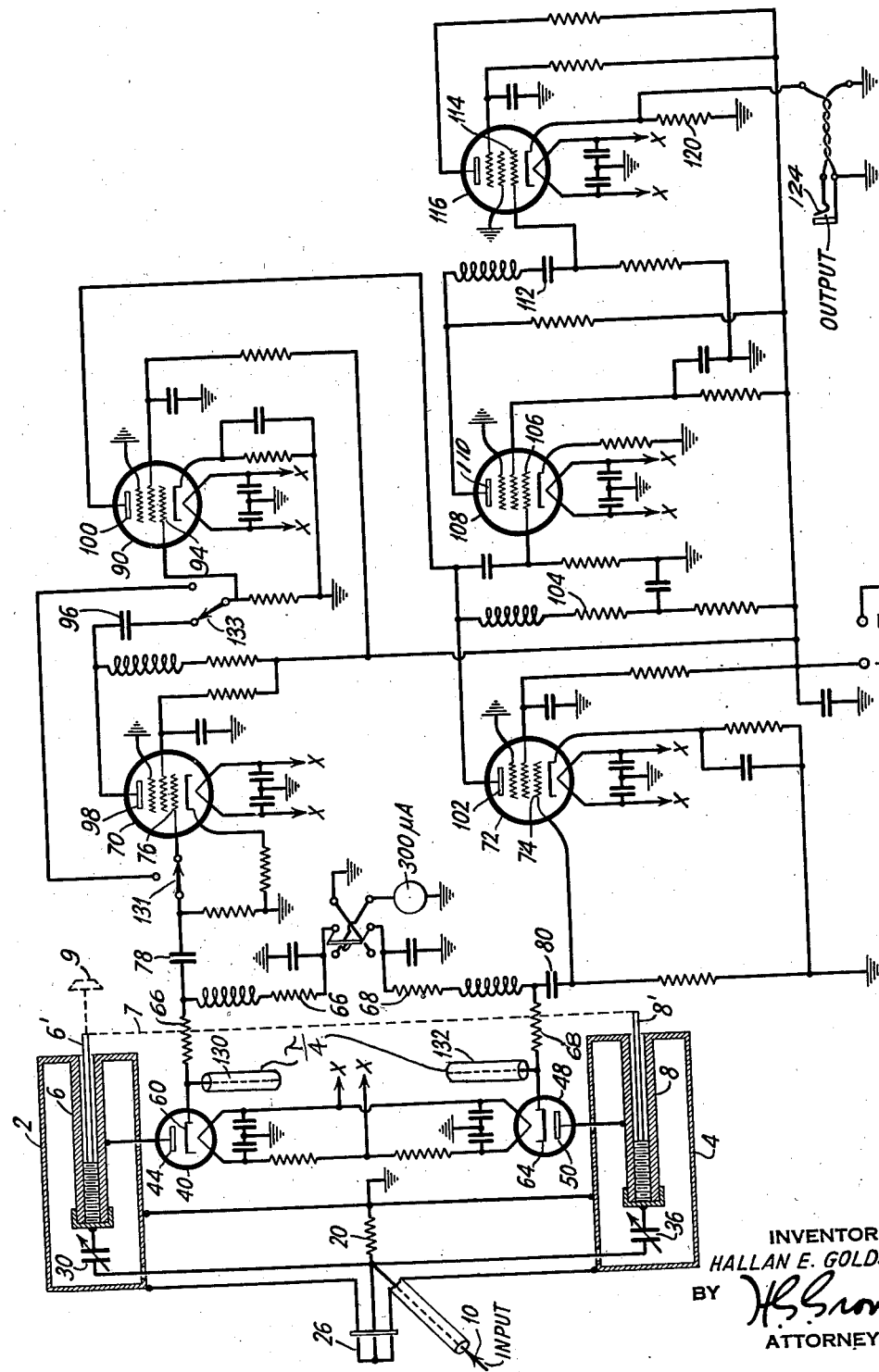
INVENTOR
HALLAN E. GOLDSTINE
BY
ATTORNEY Patented Nov. 16, 1943

2,334,190

UNITED STATES PATENT OFFICE 2,334,190

FREQUENCY MODULATION DETECTION

Hallan E. Goldstine, Rocky Point, N. Y., assignor to Radio Corporation of America, a corporation of Delaware Application June 18, 1940, Serial No. 341,111

8 Claims. (Cl. 250—27)

This application concerns a new and improved modulation monitor. The modulation monitor of this disclosure may be used with any type of frequency modulator although the particular monitor described was used with a 500 mc. television relay. In the monitor of my invention, I take a small amount of energy from the output of the terminal transmitter or one of the relay stations and convert the frequency modulated output to amplitude modulation and then amplify the video signal so that it may be applied to a coaxial cable for monitoring the output of the station at a convenient place.

In describing my invention, reference will be made to the attached drawing wherein the single figure illustrates an embodiment of my monitoring system.

In order to monitor the video transmission or other frequency modulations on wave energy, it is desirable that the monitor be simple in construction and as free as possible of elements which would introduce undesirable distortion. The frequency modulation detectors of the monitor consist of two concentric line resonators which are essentially a quarter wave length long. These two resonators are designated generally by the reference numerals 2 and 4 and each comprise an inner conductor 6 and 8 and an outer conductor which is at ground potential. In this particular case, the inner conductors 6 and 8 were made of Invar. This material was used because it has a relatively high loss and it was desired that the circuit be rigid and relatively free from temperature effects and yet have a relatively low Q so that the frequency band of at least ±5 mc. could be easily handled. The Q of these circuits was about 40. An advantage of using a line section for the discriminators is that the circuits are rigid and prevent vibration from producing an undesired output from microphonics.

The input to thise circuits is supplied from the transmitter by radiation or by coupling and may be taken from the antenna or the transmission line leading to the antenna and is applied at 10 in such a manner that the energy which the monitors require does not appreciably affect the transmission line. The input to the frequency discriminator circuits 6 and 8 is made effectively aperiodic over the band which it is desired to detect so that if a transmission line, a number of wave lengths long, is used to feed these diodes, it is necessary that this transmission line should be terminated in its characteristic impedance and the capacity which the line works into is tuned out by means of inductor 26 so that the line would be substantially flat and would not change the frequency characteristic of the circuits 6 and 8 over the frequency band through which the carrier frequency is shifted. The small tuning inductance 26 which is used in parallel with the load resistor 20 to tune out the capacity to ground of the input circuit may be as illustrated of the pot or cylinder or line type, although other types may be used.

The transmission line then takes energy from the transmitter and supplies it to a resistance termination in the line. This resistance is shown at 20. This voltage is fed by means of two small condensers 30 and 36 to a high impedance point on the Invar lines 6 and 8. These condensers are adjustable and are set so that the coupling of the lines will be quite small and, also, to balance the voltage of the two circuits. These circuits comprising lines 2 and 4, tuning inductance 26 and condensers 30 and 36 are then tuned an equal amount off of resonance, one above and the other below the frequency of the modulated wave the modulations on which are to be investigated.

Preferably, the resonant frequencies of the lines 2 and 4 are subject to a common control means. For example, I propose to use a mechanical linkage, illustrated schematically at 7, actuated by a single control 9 to change the resonant frequency of both of the resonant control lines simultaneously. This change is accomplished by adjusting the length of the inner members 6 and 8 by means of threaded members 6' and 8'. Individual adjustment of the lines by this means or additional means provides for tuning each individual line above and below frequency. By this means I am enabled to set the peak of the resonant frequencies of the two diode systems a fixed frequency apart, say 10 mc., and yet I am able to shift the center frequency maintaining this fixed separation. Thus, if the carrier frequency changes slightly, it is only necessary to operate the common control which shifts the frequency of both of the lines in the same direction like amounts.

A high frequency diode rectifier system 40, the plate 44 of which is tapped about half way up the line 6, rectifies the voltage and converts it to amplitude modulation. A similar diode system 48 the plate 50 of which is coupled to the line 8, rectifies voltages in the line 4. The cathodes 60 and 64 of these diodes 40 and 48 then feed through resistances 66 and 68 to the input of a push-pull video amplifier. This amplifier comprises tubes 70 and 72 having control grids 74 and 76 coupled by condenser 78 and 80 to the resistances 66 and 68. Acorn type tubes 70 and 72 are used for the input tubes of the video amplifier so that the diodes 40 and 48 will work into a low capacity. An extra amplifier stage comprising tube 90 having its grid 94 coupled by condenser 96 to the anode 98 of tube 70 is used in one side of the amplifier to invert the phase of the voltages and then the outputs derived from the anode 100 of amplifier 90 and the anode 102 of amplifier 72 are combined in the common portion of their plate circuits in a common resistor 104 which then feeds voltage to the grid 106 of tube 108 of another stage of single ended amplifier. This single ended amplifier has an anode 110 coupled by condenser 112 to the grid 114 of an additional amplifier stage tube 116. It is necessary that the phase shift be kept very low in the additional or inverting stage of the video amplifier so that at the higher frequencies the two sides of the amplifier will add properly in phase.

The output of the amplifier 116 is fed from the cathode circuit resistance 120 so that it may be possible to work into a coaxial cable and terminate this cable in its characteristic impedance. A kinescope monitor or oscilloscope may then be used to determine if the signal is being transmitted through the relay station properly. The output here is shown as being derived from a jack 124 coupled by a twisted pair to the cathode of tube 116.

The amplifier is fed from a regulated power supply not shown.

An additional advantage accruing from the use of my system is that amplitude variations are in push-push on the amplifier stages 70 and 72 as well as on the rectifier stages 40 and 48 and are more completely cancelled out.

It will be noted that the outputs of the two diode rectifiers, of the off-tuned or opposed slope frequency modulating converting system, are kept separate and are separately amplified and then supplied to a common circuit in the outputs of amplifiers 90 and 72 in phase to combine the same. In systems of this general nature known heretofore and used, say for wave demodulation and/or automatic frequency control purposes, the rectifier outputs have been added and the difference of the differentially combined outputs used. In these known systems the cathode of one of the rectifiers is at high radio-frequency potential and introduces many problems such as insulation, etc., not encountered in my system. The use of the separate push-pull excited amplifiers 70 and 72 working into a common output circuit 104 by way of an unequal number of amplifier stages in the two paths permits use of the diodes as illustrated with both cathodes at low-frequency potential. When the output of one diode, say diode 40, is switched by means of switches 131 and 133, from the input of the reverser tube 70 to the input of the next tube 90 so that the outputs of the diodes are connected for push-push operation, amplitude modulation may be detected. That is, due to the effective push-push output of the rectifiers, amplitude modulation present on the transmitter will be detected. This might be useful in checking or adjusting for amplitude modulation output.

There are several modifications which might be desirable to use in connection with this monitor amplifier. One is that the diode outputs of the converter circuit may be used to supply a voltage for automatic frequency control so that if the frequency changes, the direct current from the diodes will be unbalanced and will operate a tuning mechanism to correct this unbalance. High impedance quarter wave length lines 130 and 132 open at the far end may be connected to the cathodes of the diodes to suppress the radio frequency without adding materially to the capacity which the diodes have to work into.

What is claimed is:

1. In a modulated wave analyzing circuit, two frequency discrimination circuits having overlapping conversion characteristics, means for impressing the waves to be analyzed on said circuits, a pair of detectors each having a cathode and an additional electrode, a circuit coupling the additional electrode of each detector to one of said frequency discrimination circuits, a modulation potential impedance coupling the cathode of each detector to ground, an output circuit, a first amplifier comprising an odd number of tube stages coupling one of said impedances to said output circuit, a second amplifier comprising an even number of tube stages coupling the other of said impedances to said output circuit and a switch for removing a stage from one of said amplifiers.

2. In a system for detecting changes in frequency of wave energy, two circuits one of which is tuned to resonance above the mean frequency of the wave energy and the other of which is tuned to resonance below the mean frequency of the wave energy, a pair of detectors each having a cathode and an additional electrode, a circuit coupling the additional electrode of each detector to one of said resonant circuits, connections for maintaining the cathode of each detector above ground modulation frequency potential and at low wave energy frequency potential, an output circuit, a first amplifier comprising an odd number of stages coupling the cathode of one detector to said output circuit, and a second amplifier comprising an even number of stages coupling the cathode of the other detector to said output circuit.

3. In means for detecting variations in the frequency of wave energy, a pair of circuits resonant above and below respectively the mean frequency of the said wave energy to be detected, means for impressing said wave energy on said circuits, a pair of rectifiers each having an input and an output, connections coupling the input of each rectifier to a different one of said circuits, a combining circuit, an independent amplifier system coupling the output of each rectifier to said combining circuit, and a phase reverser in one of said independent amplifier systems for relatively reversing the phases of the currents supplied thereby to said combining circuit.

4. In means for detecting variations in the frequency of the wave energy, two means for converting variations in the frequency of said wave energy into corresponding variations in the amplitude of said wave energy, a rectifier coupled to each of said means, a separate output circuit for each rectifier, a combining circuit, a first amplifier comprising an odd number of amplifier tube stages coupling the output circuit of one of said rectifiers to said combining circuit, and a second amplifier comprising an even number of amplifier tube stages coupling the output circuit of the other of said rectifiers to said combining circuit.

5. In means for detecting variations in the frequency of wave energy, a pair of resonant lines, resonant above and below respectively the mean frequency of the waves to be detected, a rectifier system coupled to each line, a separate output circuit for each rectifier system, a combining circuit, a first amplifier comprising an odd number of amplifier tube stages coupling the output circuit of one of said rectifier systems to said combining circuit, and a second amplifier comprising an even number of amplifier tube stages coupling the output circuit of the other of said rectifier systems to said combining circuit.

6. In means for detecting variations in amplitude or in frequency of wave energy, a pair of resonant circuits, resonant above and below respectively the mean frequency of the waves to be detected, a rectifier system coupled to each of said circuits, a separate output circuit for each rectifier system, a combining circuit, a first amplifier comprising an odd number of amplifier tube stages coupling the output circuit of one of said rectifier systems to said combining circuit, a second amplifier comprising an even number of amplifier tube stages coupling the output circuit of the other of said rectifier systems to said combining circuit, and means for removing an amplifying stage from one of said amplifiers or adding an amplifier stage to one of said amplifiers whereby said amplifiers both have an odd number of stages or an even number of stages.

7. In a system for demodulating wave energy the wave length or the amplitude of which may vary, separate means excited by said wave energy for producing two wave energies, the amplitudes of which vary in accordance with the variations in wave length of said first wave energy and also in accordance with the amplitude variations of said first wave energy, a rectifier coupled to each of said means, an output, a separate electron discharge tube amplifier system coupling each rectifier to said output, there being a like number of tube amplifiers in said amplifier systems when said wave energy is of varying amplitude and an unlike number of amplifier tubes in said amplifier systems when said wave energy is of varying wave length.

8. In a system for demodulating wave length modulated wave energy, a pair of electron discharge devices each having an anode and a cathode, a pair of circuits tuned, one to a frequency above the mean frequency of said wave energy and the other to a frequency below the mean frequency of said wave energy, said circuits being responsive to said wave energy, a coupling between the anode and cathode of one of said devices and one of said circuits, a coupling between the anode and cathode of the other of said devices and the other of said circuits, an impedance connected between the cathode of each of said devices and ground or equivalent potential, a combining circuit, an amplifier including an even number of discharge tubes connected in cascade, means coupling the input of said amplifier to one of said impedances and the output of said one of said amplifiers to said combining circuit, a second odd-number-of-stages amplifier comprising at least one electron discharge tube, a coupling between the input of said second amplifier and the other of said impedances and between the output of said second amplifier and said combining circuit.

HALLAN E. GOLDSTINE.